US009587431B2

(12) United States Patent
Choo et al.

(10) Patent No.: US 9,587,431 B2
(45) Date of Patent: Mar. 7, 2017

(54) MOTORIZED WINDOW COVERING ASSEMBLY

(71) Applicant: Jackson Global Pte. Ltd., Singapore (SG)

(72) Inventors: Chong Kun Choo, Singapore (SG); Hong Seng Tan, Singapore (SG)

(73) Assignee: Jackson Global Pte. Ltd., Jackson Design Hub (SG)

(*) Notice: Subject to any disclaimer, the term of this patent is extended or adjusted under 35 U.S.C. 154(b) by 754 days.

(21) Appl. No.: 13/840,579

(22) Filed: Mar. 15, 2013

(65) Prior Publication Data

US 2014/0277749 A1 Sep. 18, 2014

(51) Int. Cl.

| | |
|---|---|
| ***G05B 15/00*** | (2006.01) |
| ***A47H 7/00*** | (2006.01) |
| ***A47H 1/00*** | (2006.01) |
| ***E06B 9/72*** | (2006.01) |
| *E06B 9/42* | (2006.01) |
| *E06B 9/68* | (2006.01) |

(52) U.S. Cl.
CPC *E06B 9/72* (2013.01); *E06B 9/42* (2013.01); *E06B 2009/6809* (2013.01)

(58) Field of Classification Search
CPC ....... E06B 2009/6809; E06B 9/42; E06B 9/72
USPC .................................. 700/205; 160/311, 405
See application file for complete search history.

(56) References Cited

U.S. PATENT DOCUMENTS 4,839,544 A 6/1989 Sakai
5,398,900 A 3/1995 Schober
7,091,682 B2 8/2006 Walker
7,382,067 B2 6/2008 Nakagawa et al.
7,498,700 B2 3/2009 Ohno
(Continued)

FOREIGN PATENT DOCUMENTS

EP 0838574 A2 4/1998
JP 2006-254581 A 9/2006

OTHER PUBLICATIONS

International Search Report and Written Opinion for International Patent Application No. PCT/IB2012/002906 dated Jun. 24, 2013, pp. 1-10.

(Continued)

*Primary Examiner* — Kenneth M Lo
*Assistant Examiner* — Yuhui R Pan
(74) *Attorney, Agent, or Firm* — Renner, Otto, Boisselle & Sklar, LLP

(57) ABSTRACT

Various embodiments relate to apparatuses and methods of attractive, low cost, controllable, or other featured motorized window covering assemblies. The use of a motor assembly with an integrated WiFi interface enables eliminating a setup box, resulting in lower cost. Eliminating the setup box and any associated wires further eliminates the eye sore that they may pose. These eliminations, along with an elongated motor assembly used in some embodiments, further enable the motor to be made less noticeable by, for example, making it easier to hide or camouflage. As one example, an elongated motor assembly, comprising an elongated casing surrounding the motor and the control board, is hidden inside a window covering holder. An IP address can be assigned to each motor, which enables addressing and controlling each motor individually from any remote device located anywhere with access to the internet.

3 Claims, 6 Drawing Sheets

(56) References Cited

U.S. PATENT DOCUMENTS

| | | | | |
|---|---|---|---|---|
| 2006/0225358 | A1 | 10/2006 | Haag et al. | |
| 2008/0088188 | A1 | 4/2008 | Busch | |
| 2008/0250716 | A1 | 10/2008 | Ranaudo et al. | |
| 2010/0175838 | A1* | 7/2010 | Faller et al. | 160/310 |
| 2010/0215375 | A1* | 8/2010 | Reams | G08C 17/02 398/107 |
| 2011/0048655 | A1 | 3/2011 | Andreasen et al. | |
| 2012/0031567 | A1 | 2/2012 | Shier et al. | |
| 2012/0050596 | A1* | 3/2012 | Feldstein et al. | 348/311 |
| 2012/0090797 | A1 | 4/2012 | Mullet et al. | |
| 2012/0125543 | A1* | 5/2012 | Chambers et al. | 160/5 |

OTHER PUBLICATIONS

International Search Report and Written Opinion for International Patent Application No. PCT/IB2013/001347 dated Nov. 12, 2013, pp. 1-12.

Co-pending U.S. Appl. No. 13/369,231 by Choo, C.K., filed Feb. 8, 2012.

Co-pending U.S. Appl. No. 13/372,296 by Choo, C.K. et al., filed Feb. 13, 2012.

Non-Final Office Action Mailed Jan. 17, 2014 in Co-Pending U.S. Appl. No. 13/372,296 of Koo, et al., filed Feb. 13, 2012.

Final Office Action mailed Jul. 14, 2014, for U.S. Appl. No. 13/372,296 of Choo, C.K. et al., filed Feb. 13, 2012.

* cited by examiner

MOTORIZED WINDOW COVERING ASSEMBLY

CROSS-REFERENCE TO RELATED APPLICATIONS

This application claims the benefit of U.S. Provisional Application No. 61/644,275 entitled "WIFI MOTOR" filed on May 8, 2012 which is hereby incorporated by reference for all purposes in its entirety.

BACKGROUND

Window coverings can be used to cover a window and/or a portion of a wall. In many cases, window coverings can be used for managing sunlight, creating privacy, or other functional purposes. Window coverings can additionally provide a variety of decorative features to enhance the enjoyment of a space. Some window coverings are attached to a motorized window covering assembly to aid a user in opening and closing the window covering.

Motorized window covering assemblies holding window coverings such as curtains and blinds are often unattractive due to the visual appearance of the motor assembly and related parts. For example, motors used to automate the opening and closing of the window coverings may be located in plain sight or may be covered by a light window covering fabric, creating an unpleasant visual experience for the user. Where control lines or wires are needed to control the motors, they may be run so as to create an eye sore. A setup box has historically been needed to integrate traditional motors into WiFi systems for controlling the motors remotely. The setup box may be located in plain sight or in a location that is visually unattractive. There is a need for motor assemblies that increase the attractiveness of motorized window covering assemblies.

Motorized window covering assemblies are costly. The setup boxes, which have historically been needed to integrate traditional motors into WiFi systems for controlling the motors remotely, have a limited range. Consequently, a number of setup boxes may be needed when the motors are spread over a wide range (e.g., throughout a house or building). Additionally, the setup boxes are costly, increasing the cost of installing motorized window covering assemblies. There is further cost associated with devices used by users, such as remote controls, to send commands to the window covering assemblies to open and close the window coverings. There is a need to reduce the cost of installing motorized window covering assemblies.

Motorized window covering assemblies historically could only be controlled by a user when the user was within a limited range. The devices used by users to send commands to the window covering assemblies have a limited range. A user outside of this range will not be able to control, for example, a window shade in their bedroom or living room. In houses or buildings with a large number of motorized window covering assemblies, a single user with a single device may not be able to control each of the window covering assemblies in the house or building. This prevents, for example, a central command center in a large building from controlling all the motorized window covering assemblies in the building. There is a need to improve the ability to control motorized window covering assemblies.

SUMMARY

Various embodiments of the present invention are directed to apparatuses and methods of motorized window covering assemblies. More specifically, various embodiments of the present invention relate to apparatuses and methods of attractive motorized window covering assemblies, of low cost motorized window covering assemblies, of controllable motorized window covering assemblies, or of other features of motorized window covering assemblies. It is not necessary for all embodiments of the invention to have all the advantages of the invention or fulfill all the purposes of the invention. The use of a motor with an integrated WiFi interface enables the elimination of the setup box, resulting in a lower cost. Eliminating the setup box and any lines or wires associated with the setup box additionally eliminates the eye sore that they may pose. This, along with an elongated motor assembly used in some embodiments, enables the motor assembly to be made less noticeable by, for example, making the motor assembly easier to hide or camouflage.

As one example of hiding the motor assembly, an elongated motor assembly, comprising an elongated casing surrounding the motor and the control board, is hidden inside of the window covering holder. As another example, the elongated motor assembly is integrated into other parts of the physical structure of the window covering assembly in a manner that makes the motor assembly less noticeable. Hiding or camouflaging the motor assembly makes the motorized window covering assembly correspondingly more attractive.

Using a remote device (e.g., a laptop), an IP address can be assigned to each motor, enabling each motor to be individually addressed and controlled from any remote device located anywhere in the world with access to the internet. This enables an increased ability to control the motorized window assemblies. For example, a user in an office building control station can, using one remote device, or one server configured as a central control system, control any of the motorized window covering assemblies in the building.

Some embodiments of the disclosed apparatus comprise a motor, a window covering holder coupled to the motor, and a control board communicably coupled to the motor. The control board includes a WiFi interface to receive control signals. The control board controls, by providing current or voltage, operation of the motor in accordance with the control signals received through the WiFi interface. The motor causes at least a portion of the window covering holder to move such that a window covering attached to the window covering holder would also move. The motor can be a DC motor, a brushed DC motor, a brushless DC motor, an AC motor, or a stepper motor. The control board can include a motor control unit having at least one control interface. The window covering can be attached to the window covering holder. The window covering can be a curtain, a blind, a drape, a screen, a shade, a roller, or a shutter. The control board provided current or voltage to control the operation of the motor can communicate digital signals. Some of the embodiments can further include a power supply board, a step-down transformer, or a rectifier, and can additionally include an RF interface communicably coupled to the control board. An RF device can send control signals which are received through the RF interface, and the control board can control the operation of the motor in accordance with the received control signals. The WiFi interface and the RF interface can be an integrated WiFi/RF module.

In some embodiments, an elongated casing surrounds the motor and the control board. The window covering holder can be the elongated casing surrounding the motor and the control board. The window covering holder and the elongated casing can both have a cylindrical shape. A portion of the window covering holder can be hollow, and the elongated casing, including the motor and the control board that it surrounds, can be located inside of the hollow portion of the window covering holder. The hollow portion of the window covering holder can extend from a first end of the window covering holder to a second end of the window covering holder, and the elongated casing can extend from the first end of the window covering holder to the second end of the window covering holder. The second end of the window covering holder can have an end cap, and the second end of the casing can have an end cap. The elongated casing can be made of a composite material, for example plastic. The elongated casing can be made be for dissipating heat, absorbing noise, reducing weight, or preventing electrical conduction.

Some embodiments comprise an elongated motor assembly and a window covering holder coupled to the elongated motor assembly. The elongated motor assembly includes a motor, a control board communicably coupled to the motor, and an elongated casing enclosing the motor and the control board. The control board controls operation of the motor in accordance with received control signals. The window covering holder and the elongated casing both have a cylindrical shape. A portion of the window covering holder is hollow, and the elongated motor assembly is located inside of the hollow portion of the window covering holder. The operation of the motor causes at least a portion of the window covering assembly to move such that a window covering attached to the window covering holder would also move. Some of the embodiments can include an RF interface communicably coupled to the control board. The received control signals, which can be sent by an RF device, can be received via the RF interface.

Some embodiments are methods for controlling a WiFi motorized window covering assembly, the method comprising receiving control signals and controlling the operation of a motor in accordance with the received control signals. The control signals are received by a WiFi interface on a control board communicably coupled to a motor. An elongated casing surrounds the motor and the control board. The motor is mechanically coupled with a window covering holder. The operation of the motor causes at least a portion of the window covering holder to move such that a window covering attached to the window covering holder would also move. The control signals that are received by the WiFi interface can be generated by a remote device. The remote device can download an application to enable the remote device to generate the control signals that are received by the WiFi interface. The control signals can be transmitted through a network, or they can be received by the WiFi interface directly from the remote device. Some of the embodiments further comprise receiving, by an RF interface on the control board, control signals from an RF device. The WiFi interface and the RF interface can be an integrated WiFi/RF module. The remote device generated control signals can be received by a plurality of WiFi interfaces, each WiFi interface on a control board communicably coupled to a motor.

Some embodiments comprise a plurality of WiFi motorized window covering assemblies, a network, a central control system, and at least one remote device. The central control system sends a common command to at least two of the plurality of WiFi motorized window covering assemblies. A user undertakes one sequence of steps that causes the central command system to send the common command. Some of the embodiments further comprise at least one RF device.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
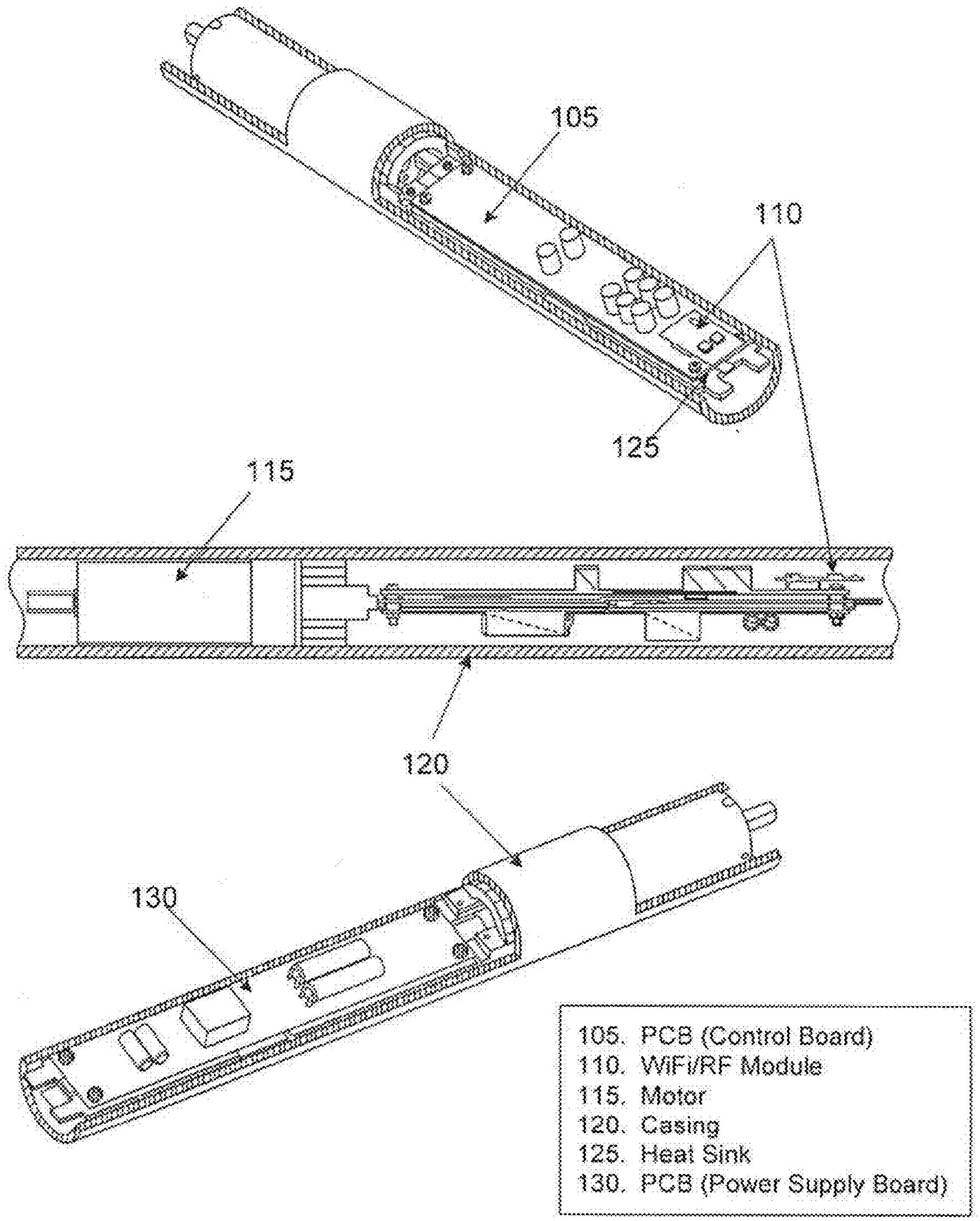
FIG. 1 illustrates a motor assembly.

The drawings are not necessarily drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention are directed to apparatuses and methods of motorized window covering assemblies. More specifically, various embodiments of the present invention relate to apparatuses and methods of attractive motorized window covering assemblies, of low cost motorized window covering assemblies, of controllable motorized window covering assemblies, or of other features of motorized window covering assemblies. It is not necessary for all embodiments of the invention to have all the advantages of the invention or fulfill all the purposes of the invention.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 illustrates a motor assembly in accordance with various embodiments of the present invention. As illustrated in FIG. 1, the motor assembly is an elongated motor assembly and includes a control board 105, a WiFi/RF module 110, a motor 115, a casing 120, a heat sink 125, and a power supply board 130. Other embodiments of the present invention can include some or all of these components. Still yet, additional components and/or modules can be included in some embodiments of the motor assembly.

Control board 105 includes an interface module for transmitting and receiving data and/or commands for controlling motor 115. The interface module is an integrated WiFi/RF module 110. The WiFi/RF module 110 is configured to transmit and/or receive data, control signals, or commands through a network, such as network 605 in FIG. 6, or directly to/from an RF device, such as RF device 625 in FIG. 6, or a remote device, such as remote device 620 in FIG. 6. The control signals received through the WiFi/RF module 110 are converted, by control board 105, into a current or voltage to control the operation of the motor in accordance with the control signals. The current or voltage can communicate digital signals which represent the control signals and/or the commands for controlling the operation of the motor 115.

The digital signals can be received by one or more components or devices that convert the received digital signals into a second current or voltage that powers the motor such that motor operates in accordance with the received digital signals which represent the control signals. Alternatively, the control board 105 converted current or voltage can power the motor such that motor operates in accordance with the received control signals. The powering of the motor by the current or voltage can involve the current or voltage powering the motor directly, or can involve the current or voltage entering components, devices, or circuits such as rectifiers, transformers, step down transformers, waveform conditioning circuits, and/or waveform amplifying circuits and being transformed into a third current or voltage which can power the motor such that motor operates in accordance with the received control signals. The WiFi/RF module can be used to interface with wireless networks, remote devices, and/or RF devices, such as RF device 625 of FIG. 6, which can be an RF remote control, or an RF remote using touch, Wii technology, or voice interface.

Figure 6:
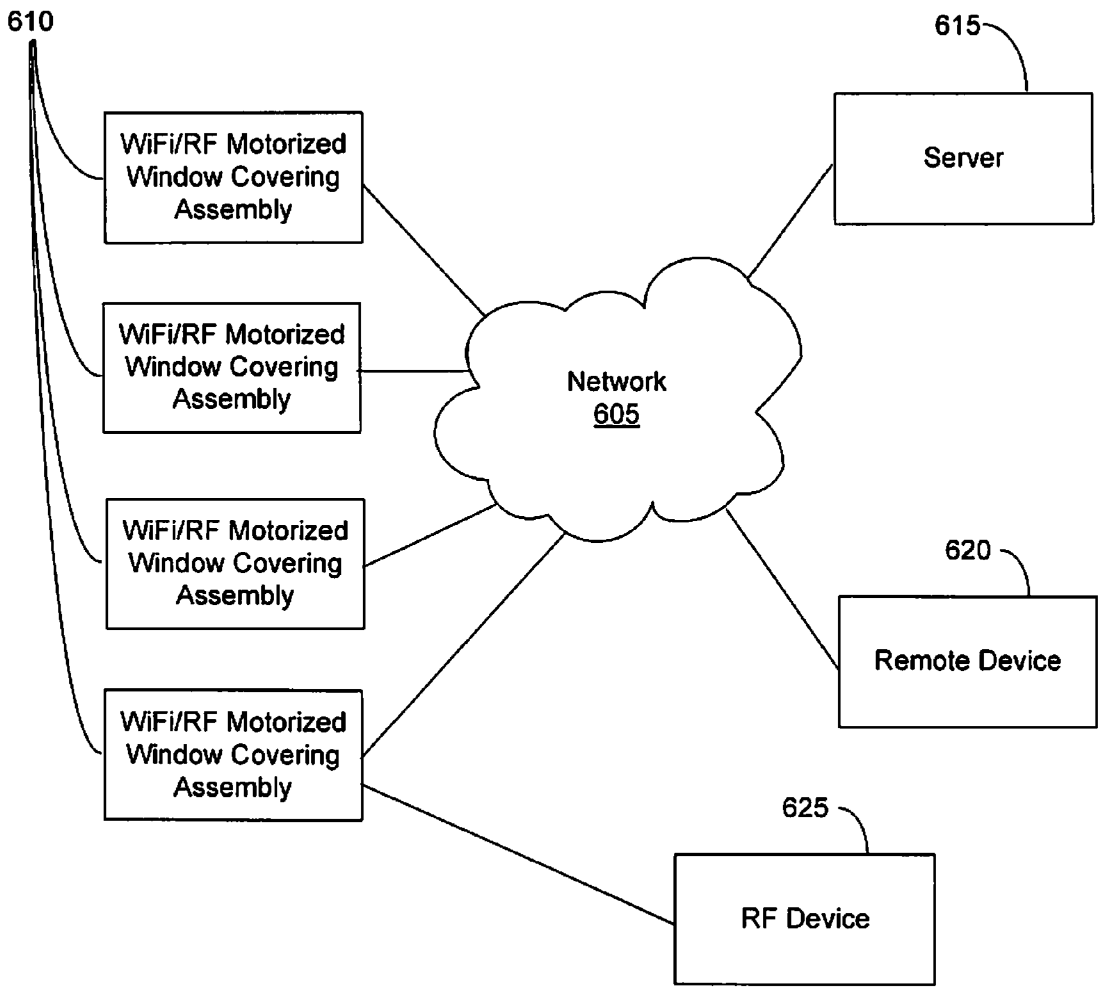
FIG. 6 illustrates a network of WiFi/RF motorized window covering assemblies.

Remote devices, such as remote device 620 in FIG. 6, include smart phones, tablets, laptops, personal computers, computers, servers, and/or other devices used to control the operation of the motor. Using a remote device, an IP address can be assigned to each motor. Various embodiments allow the user to download one or more applications to a remote device to provide a user interface on the remote device to control the operation of the motor. Once a motor is assigned an IP address, it can send and/or receive data, control signals, or commands to/from any other device with an IP address, and the operation of the motor can be controlled according to any received control signals or commands. Using a remote device, a user can control the operation of the motor from anywhere in the world as long as the remote device has Internet access at that location. The remote device can send and/or receive data, control signals, or commands to/from the motor over a network, for example, a local area network, a wide area network, a cellular network, and/or the internet. The data, control signals, or commands can be sent/received over the network to/from a device that can relay the data, control signals, or commands over a wireless network to/from the WiFi module 110. Once received through the WiFi/RF module 110, the control board controls the operation of the motor in accordance with the received control signals or commands.

Motor 115 can be any type of motor and can be chosen based on the desired application, cost, power requirements, availability, and/or other criteria. For example, the motor can be a DC motor, a brushed DC motor, a brushless DC motor, an AC motor, a stepper motor, and the like. Depending on the type of motor and application, a motor control module/unit can be communicably coupled to control board 105. The motor control module/unit can provide the necessary interface signals for controlling motor 115.

Casing 120 is an elongated casing and can be used to surround control board 105 and motor 115. Additionally, other components can be enclosed within casing 120 such as, but not limited to heat sink 125, power supply board 130, a step-down transformer, a rectifier, waveform conditioning circuits, waveform amplifying circuits, and/or other components.

Figure 2:
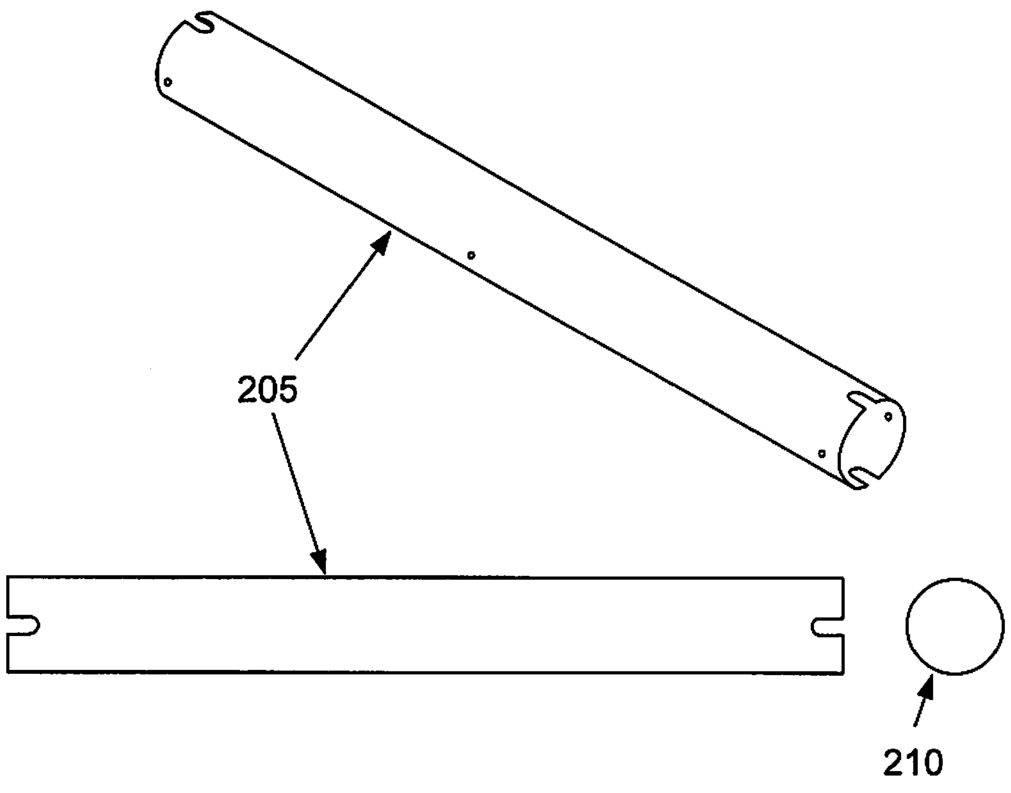
FIG. 2 illustrates a casing.

FIG. 2 illustrates an exemplary casing. Casing 205 is an elongated casing and can have a variety of properties such as, but not limited to, preventing electrical conduction (i.e. being an electrical insulator), quick heat dissipation, noise absorption, and/or being light weight. Casing 205 can be made of one or more composite materials such as plastic. Casing 205 can have any elongated shape. For example, casing 205 can have a cylindrical shape. The cylindrically shaped elongated casing 205 has a circular cross section 210. The elongated casing 205 can have an elongated shape where the cross section is a square, a rectangle, an oval, a triangle, a pentagon, a trapezoid, a hexagon, an octagon, or some other shape.

In some embodiments, the shape of the elongated casing is chosen to optimize the ability to locate the motor assembly (e.g., the elongated casing 205 and an enclosed motor and control board) inside of a window covering holder, so as to hide the motor assembly from view. To enable the hiding of the motor assembly, the window covering holder can have a hollow portion inside of which the motor assembly is located. In some of the embodiments where the window covering holder has a cylindrical shape and a cross section that is a circle, the window covering holder can have a hollow portion that has a similar but smaller cross section and shape. In order to locate the motor assembly inside of this window covering holder, the motor assembly can have a similar and even smaller cross section and shape, sized so as to enable the elongated casing 205, including an enclosed motor and circuit board, to fit in the hollow portion of the window covering holder. In some of the embodiments, the window covering holder can have a complex shape and can have a hollow portion that has, for example, a square or rectangular or irregularly shaped cross section.

In each of these examples, the elongated casing can have a shape that is optimized to fit inside of the hollow portion of the window covering holder. In the case of the window covering holder having a hollow portion with a rectangular or square cross section, the casing can have a similar but smaller cross section sized so as to enable the elongated casing 205, including an enclosed motor and circuit board, to fit in the hollow portion of the window covering holder. In the case of the window covering holder having a hollow portion with an irregularly shaped cross section, the elongated casing can have a shape and associated cross section chosen to optimize the ability to locate the motor assembly inside of the hollow portion of the window covering holder.

Figure 3:
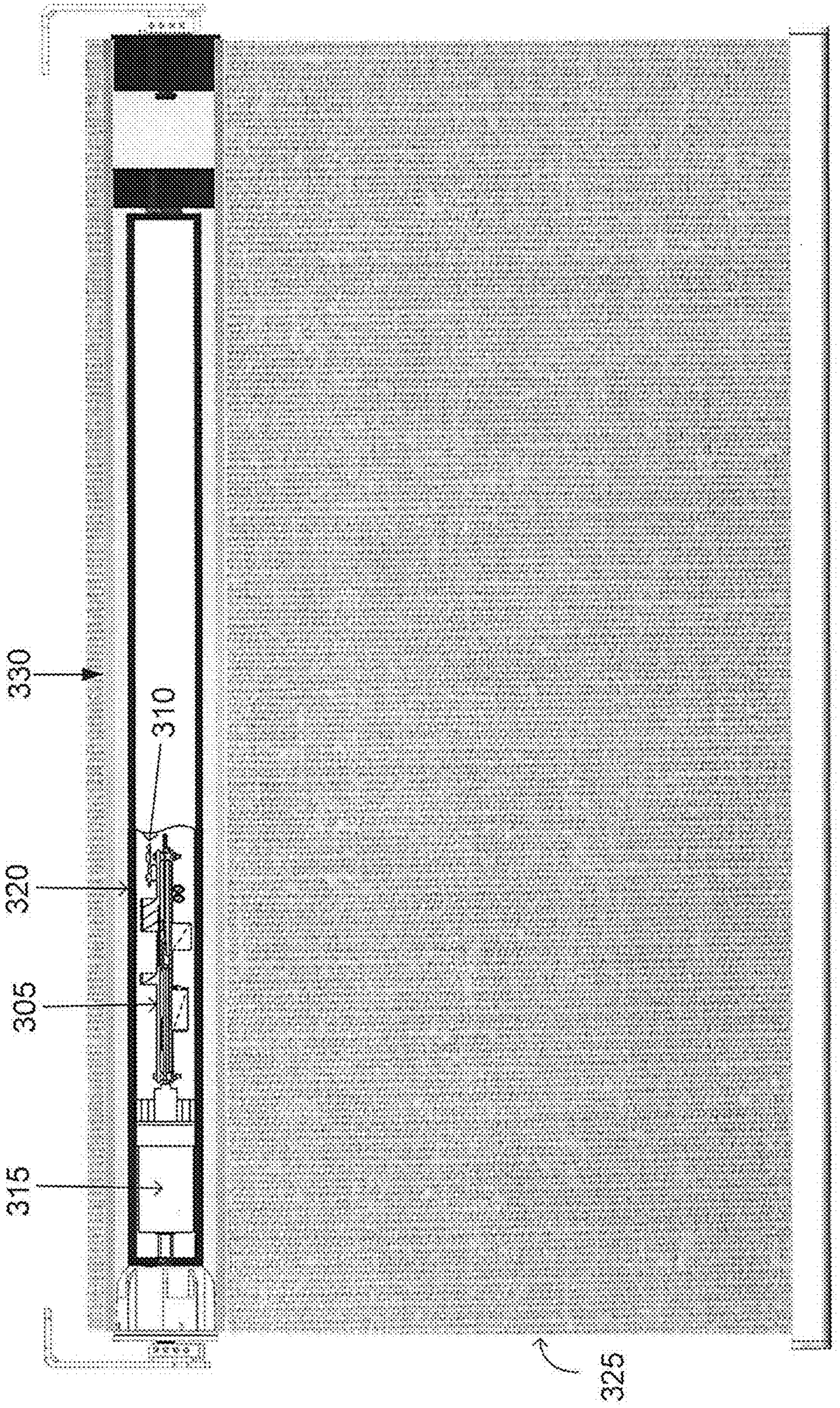
FIG. 3 illustrates a motorized window covering assembly with an attached window covering.

FIG. 3 illustrates an exemplary motorized window covering assembly with an attached window covering. Window covering holder 330 holds window covering 325. Window covering holder 330 has a hollow portion, inside of which the motor assembly is located, the motor assembly comprising the elongated casing 320, the enclosed motor 315 and the enclosed circuit board 305, both the motor 315 and circuit board 305 enclosed in the elongated casing 320. The circuit board includes WiFi/RF module 310. The hollow portion of window covering holder 330 can extent a portion of the length of window covering holder 330, or can extend the entire length of window covering holder 330. The elongated casing 320 can extend a portion of the length of window covering holder 330, or can extend the entire length of window covering holder 330. The window covering holder 330 can have an end cap on one end, and the elongated casing 320 can similarly have an end cap on one end. In some embodiments, window covering holder 330 is the elongated casing enclosing motor 315 and control board 305 (i.e. there is no separate elongated casing and window covering holder, they are one and the same).

Window covering holder 330 can hold the window covering by the window covering 325 being attached to the window covering holder 330. The window covering 325 can be attached to the window covering holder 330 by an adhesive. The window covering 325 can be attached to the window covering holder 330 by a portion of the window covering 325 being inserted into a slot, hole, groove or a trench of window covering holder 330. The window covering 325 can be attached to the window covering holder 330 with fasteners such as screws, nails, pins, clips, rivets, clamps, staples, and other types of fasteners.

Window covering holder 330 can have various shapes and still be functional. As a non-limiting example, window covering holder 330 can be a curtain track and associated curtain carriers. The curtain track can accommodate a curtain carrier that rolls/glides in the track of the curtain track. The curtain carrier can have a hook for attaching to the window covering, an example of the window covering being a curtain. In this example, the operation of the motor causes a portion of the curtain holder (i.e. the curtain carrier) to move (i.e. to roll/glide in the track), such that a window covering (i.e. a curtain) attached to the window covering holder (i.e. a curtain hung on the curtain carrier hooks) would also move. As is well known to those skilled in the art, there are many different types of window covering holders and many different ways of attaching window coverings to those window cover holders. Some examples of window covering holders and methods of attaching window coverings to the window covering holder are provided to help make the disclosure more understandable, and the examples are not intended to be limiting in any way. One skilled in the art will be able to select a variety of window covering holders and, for each, an appropriate method of attaching a window covering to the window covering holder.

Figure 4:
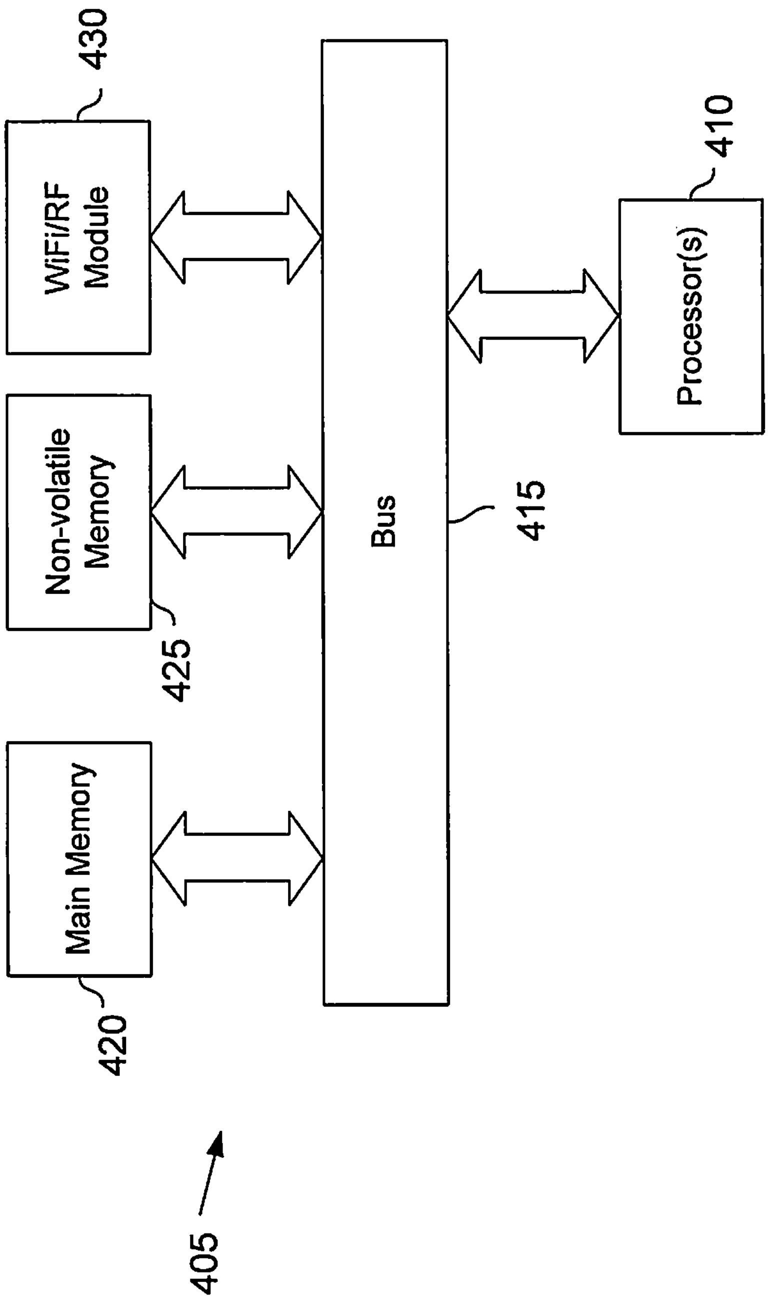
FIG. 4 is a block diagram illustrating a control board.

FIG. 4 illustrates a block diagram of an exemplary control board. An exemplary control board 405 comprises processor(s) 410, main memory 420, non-volatile memory 425, WiFi/RF module 430, and bus 415. The WiFi/RF module 430 receives and/or transmits control signals, commands and/or data, the receiving and/or transmitting accomplishing communication between WiFi/RF module 430 and an RF device, such as RF device 625 of FIG. 6, or a remote device, such as remote device 620 of FIG. 6, or with both devices. The RF device or remote device can download an application to enable the device to communicate with the WiFi/RF module 430. The received and/or transmitted control signals, commands and/or data can be communicated with the remote device through a network, such as network 605 in FIG. 6, in which case the control signals, commands and/or data will be relayed between the WiFi module and the network by a device which communicates with WiFi/RF module 430 using a wireless network, an example of the device being a WiFi router. The received or transmitted control signals, commands and/or data can additionally be communicated directly with a remote device and/or an RF device.

Bus 415 provides a communication means for communicating between main memory 420, non-volatile memory 425, WiFi/RF module 430 and/or processor(s) 410. Any or all of main memory 420, non-volatile memory 425, and/or WiFi/RF module 430 can be integrated with processor(s) 410. Bus 415 can be entirely on control board 405, can be partially on control board 405 and partially integrated with processor(s) 410, or can be entirely integrated with processor(s) 410. A person having ordinary skill in the art will recognize that there are many options well known in the art for implementing bus 415.

Control board 405 further comprises main memory 420. Main memory 420 can be any device, mechanism, or populated data structure for storing information and can encompass any type of, but is not limited to, volatile memory, non-volatile memory, and dynamic memory. For example, main memory 420 can be a random access memory (RAM), dynamic random access memory (DRAM), flash memory including NAND or NOR flash, SDRAM, SIMM, DIMM, RDRAM, DDR RAM, or any other type of memory device. Main memory 420 can be a device communicably coupled to control board 405 or can be integrated with processor(s) 410. Main memory 420 is coupled to bus 415 and stores information and instructions to be executed by processor(s) 410. Main memory 420 can further be used for storing temporary variables or other intermediate information during execution of instructions by processor(s) 410.

Control board 405 further comprises non-volatile memory 425. Non-volatile memory 425, for example, can be a read only memory (ROM), EPROM, EEPROM, or a flash memory including NAND or NOR flash. Non-volatile memory 425 can be a device communicably coupled to control board 405 or can be integrated with processor(s) 410.

Non-volatile memory 425 is coupled to bus 415 and stores information and instructions to be executed by processor(s) 410. Main memory 420 and non-volatile memory 425 can be separate memories, or can both be a single non-volatile memory (i.e. a single non-volatile memory provides the function of both main memory 420 and non-volatile memory 425).

Control board 405 further comprises processor(s) 410. The processor(s) 410 can be, or can include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices. Any or all of main memory 420, non-volatile memory 425, and/or WiFi/RF module 430 can be integrated with processor(s) 410. Bus 415 can be entirely on control board 405, can be partially on control board 405 and partially integrated with processor(s) 410, or can be entirely integrated with processor(s) 410.

Control board 405 can further be communicably coupled to other components such as, but not limited to, a WiFi module/interface, an RF module/interface, a power supply board, a step-down transformer, a rectifier, a waveform conditioning circuit or device, a waveform amplifying circuit or device, a mass storage device such as a hard disk drive or a solid-state drive, a removable storage media device such as a USB memory device, a thumb drive or a flash card, a capacitor, a resistor, or an inductor. Circuit board 405 and/or any device associated with circuit board 405 can additionally be connected to a heat sink.

Figure 5:
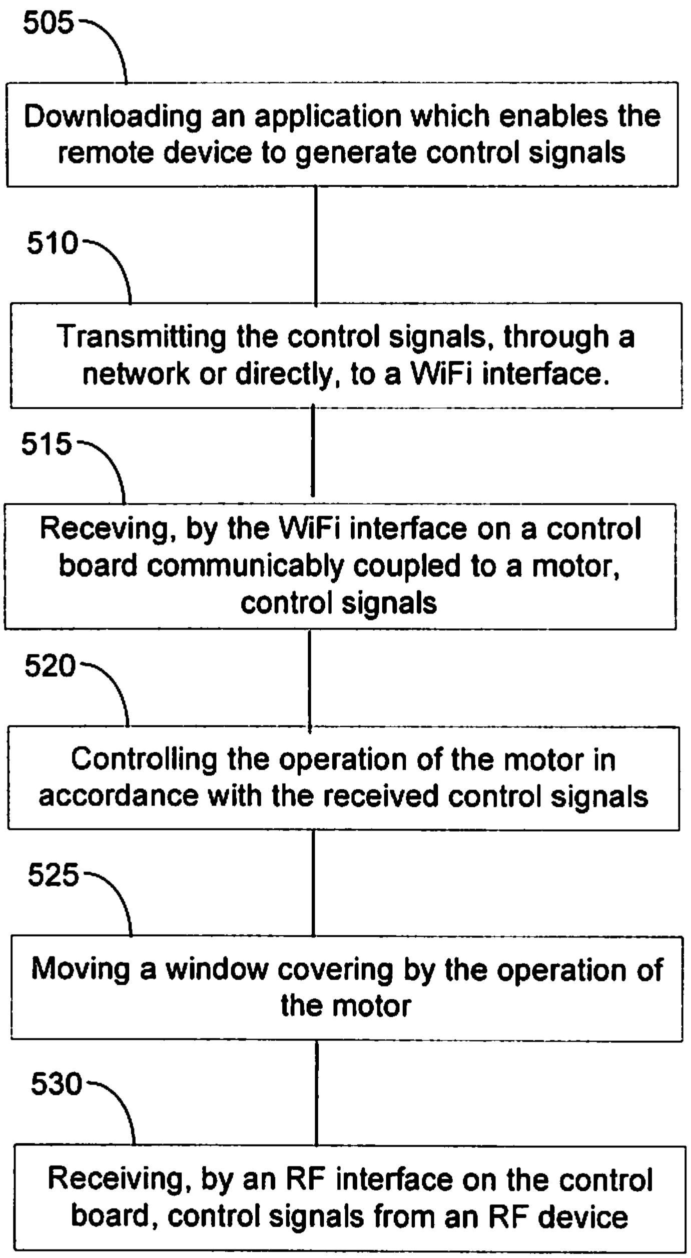
FIG. 5 is a flow chart illustrating operations for controlling a WiFi motorized window covering assembly.

FIG. 5 is a flow chart illustrating exemplary operations for controlling a WiFi motorized window covering assembly. In accordance with some embodiments of the present invention, one or more of the operations illustrated in FIG. 5 can be performed by the RF device, the remote device, and/or the various components/devices comprising the motorized window covering assembly. As illustrated at operation 505, an application is downloaded which enables the remote device to generate control signals. An example of the remote device is remote device 620 of FIG. 6. The application can be additionally downloaded by the RF device. The application can be software or firmware and can be initially provided to the RF device or remote device by downloading it from a remote system. The software or firmware of the application can further be pre-installed on the RF device or remote device, or can be installed from a non-volatile storage device. The non-volatile storage device can be, for example, a CD ROM, a DVD, a Blu-ray disc, a hard disk drive, a solid-state drive, a removable storage media device such as a USB memory device, a thumb drive or a flash card. When the application is run by the RF device or the remote device, the application configures the device enabling it to send control signals to the WiFi and/or RF module/interface.

Operation 510 transmits the control signals, through a network or directly, to a WiFi interface. An example of the network is network 605 of FIG. 6. The WiFi interface is synonymous with the WiFi module (i.e. they are one and the same). The control signals can additionally be transmitted to the RF module/interface. The RF interface is similarly synonymous with the RF module. The remote device transmits the control signals, and the control signals are communicated to the WiFi module/interface. The control signals can be transmitted through a network, in which case the control signals will be relayed by a device, for example a WiFi router, over a wireless network to the WiFi module/interface. The control signals can additionally be transmitted directly from the remote device to the WiFi module/interface, the remote device transmitting electromagnetic waves that are directly received by the WiFi module/interface. The control signals can additionally be transmitted directly from the RF device to the RF module/interface, the RF device transmitting electromagnetic waves that are directly received by the RF module/interface. An example of the RF device is RF device 625 of FIG. 6.

Operation 515 receives, by the WiFi interface on a control board communicably coupled to a motor, control signals. The control signals can further be received by an RF interface or by an integrated WiFi/RF interface on a control board communicably coupled to a motor. The control signals can further be received by an RF interface, a WiFi interface, or an integrated WiFi/RF interface, the interface integrated with the processor(s) on the control board communicably coupled to the motor.

Operation 520 controls the operation of the motor in accordance with the received control signals. The control board is communicably coupled to the motor, the communicable coupling enabling the control board to control the operation of the motor. The control board can control the operation of the motor by sending digital signals representing the received control signals or, alternatively, analog waveforms. The digital signals can be received by one or more components or devices that convert the received digital signals into a second current or voltage that powers the motor such that motor operates in accordance with the received control signals. The analog waveforms are a current or voltage that can power the motor such that motor operates in accordance with the received control signals. The powering of the motor by the current or voltage can involve the current or voltage entering components, devices, or circuits such as rectifiers, transformers, step down transformers, waveform conditioning circuits, and/or waveform amplifying circuits and being transformed into a third current or voltage which can power the motor such that motor operates in accordance with the received control signals.

Operation 525 moves a window covering by the operation of the motor. The operation of the motor, being controlled by the control board in accordance with the received signals, converts electrical energy to mechanical energy. The motor is mechanically coupled to the window covering holder, and a portion of the mechanical energy of the motor is transferred to the window covering holder through this mechanical coupling, resulting in at least a portion of the window covering holder moving. As one non-limiting example, the window covering can be a blind and the blind can be attached to a cylindrically shaped window covering holder with adhesive. As the window covering holder spins around the central axis of the cylindrical window covering holder, the blind wraps around the holder, or unwraps from the holder, thereby raising or lowering the blind. As a second non-limiting example, the window covering can be a drape and the window covering holder can be a curtain track and associated curtain carriers. The curtain carrier can have a hook that is used to attach the drape to the curtain carrier. A portion of the mechanical energy of the motor is transferred through a mechanical coupling to the curtain carriers, the curtain carriers resultantly moving along the track of the curtain track. As the curtain carriers move, they open or close the attached curtain.

Operation 530 receives, by an RF interface on the control board, control signals from an RF device. The RF interface can be a module on the control board, can be part of an integrated WiFi/RF interface on the control board, can be an RF interface integrated with the processor(s) on the control board, or can be part of an integrated WiFi/RF interface integrated with the processor(s) on the control board.

FIG. 6 illustrates an exemplary network of WiFi/RF motorized window covering assemblies. The exemplary network of WiFi/RF motorized window covering assemblies comprises network 605, a plurality of WiFi/RF motorized window covering assemblies 610, server 615, remote device 620, and RF device 625. As long as remote device 620 and server 615 have access to the network, remote device 620 and/or server 615 can transmit and/or receive control signals, commands, and/or data though network 605 to/from the WiFi interface of an integrated WiFi/RF module of any or all of the plurality of WiFi/RF motorized window covering assemblies 610. As long as a selected one of the plurality of WiFi/RF motorized window covering assemblies 610 is within the range of RF device 625, RF device 625 can transmit and/or receive control signals, commands and/or data directly to/from the RF interface of the integrated WiFi/RF module of the selected one of the plurality of WiFi/RF motorized window covering assemblies 610.

Network 605 is an IP based communications link between the plurality of WiFi/RF motorized window covering assemblies 610, remote device 620, and server 615. Network 605 can be a local area network, a wide area network, a cellular network, a WiFi network, the internet, or various other communications networks supporting IP based communications. In some cases, the communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Server 615 provides the function of a central control system by providing the ability to manage the plurality of WiFi/RF motorized window covering assemblies 610. One or more applications can be downloaded which enable Server 615 to generate control signals to control the operation of the plurality of WiFi/RF motorized window covering assemblies 610 and/or to provide the function of a central control system. The application(s) can be software or firmware and can be initially provided to server 615 by downloading it from a remote system. The software or firmware of the application(s) can further be pre-installed on server 615, or can be installed from a non-volatile storage device. The non-volatile storage device can be, for example, a CD ROM, a DVD, a Blu-ray disc, a hard disk drive, a solid-state drive, a removable storage media device such as a USB memory device, a thumb drive or a flash card. When the application(s) is run by server 615, the application(s) configures server 615 enabling it to send control signals to control the operation of the plurality of WiFi/RF motorized window covering assemblies 610 and/or to provide the function of a central control system.

The central control system can undertake various tasks or provide various functions that span or are optimized to support the plurality of WiFi/RF motorized window covering assemblies 610. The central control system can, as one non-limiting example, track the current position of the window coverings attached to the plurality of WiFi/RF motorized window covering assemblies 610. This can be accomplished by, for example, tracking the current position of the motor, the motor's current position corresponding to the window covering in a certain position The central control system can, as a second example, track the functionality status of the plurality of WiFi/RF motorized window covering assemblies 610.

The central control system can also provide functionality intended to optimize the control of the plurality of WiFi/RF motorized window covering assemblies 610. For example, the system can provide the ability for a user to send a common command to each of the plurality of WiFi/RF motorized window covering assemblies 610. Rather than the user having to repeat a sequence of steps each time the user sends a common command to each of the plurality of WiFi/RF motorized window covering assemblies 610 (e.g., a sequence of 3 steps repeated for each of 10 WiFi/RF motorized window covering assemblies for a total of 30 steps undertaken by the user in order to cause the common command to be sent to each of the 10 WiFi/RF motorized window covering assemblies), the central control system can provide functionality that enables the user to undertake one sequence of steps that causes the common command to be sent to each of the plurality of WiFi/RF motorized window covering assemblies 610 (e.g., the user undertakes a sequence of 5 steps which causes a common command to be sent to each of 10 WiFi/RF motorized window assemblies).

Numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), magnetic or optical cards, flash memory, or other type of media/machine-readable medium suitable for storing electronic instructions.

Moreover, embodiments of the present invention may also be downloaded as a computer program product or data to be used by a computer program product, wherein the program, data, and/or instructions may be transferred from a remote computer to a requesting computer by way of data signals embodied in a carrier wave or other propagation medium via a communication link (e.g., a modem or network connection). For other parts of the program, data, or instructions, this communication link may include external networks such as the telephony network (e.g., Public Switched Telephony Network, cellular, WiFi, and other voice and wireless networks) and/or the internet. In some cases, the communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

CONCLUSION

In conclusion, the present invention provides novel apparatuses, methods, and arrangements for a motorized window covering holder. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A network of motorized window covering assemblies comprising:

a plurality of motorized window covering assemblies, each of the plurality of motorized window covering assemblies comprises:

an elongated motor assembly including a motor, a control board communicably coupled to the motor, one of a step-down transformer, a rectifier, a waveform conditioning circuit and waveform amplifying circuit which is communicably coupled to the motor, and an elongated casing enclosing the motor, the control board and the one of a step-down transformer, a rectifier, a waveform conditioning circuit and waveform amplifying circuit, wherein the control board controls operation of the motor in accordance with received control signals;

a window covering holder coupled to the elongated motor assembly, wherein the window covering holder has a cylindrical shape, wherein a portion of the window covering holder is hollow, wherein the elongated motor assembly has a cylindrical shape, wherein the elongated motor assembly is located inside of the hollow portion of the window covering holder, wherein the operation of the motor causes at least a portion of the window covering holder to move such that a window covering attached to the window covering holder would also move; and a WiFi interface and a RF interface which are communicably coupled to the control board and located inside of the hollow portion of the window covering holder, wherein the received control signals are received via one of the WiFi interface and the RF interface;

a network;

a central control system communicably coupled to the plurality of motorized window covering assemblies through the network, wherein the central control system is configured to send a common command through the network to at least two of the plurality of motorized window covering assemblies, wherein a user undertakes one sequence of steps that causes the central control system to send the common command; wherein at least some of the plurality of motorized window covering assemblies are further communicably coupled, through the network, to a first remote device and configured to receive a first control command therefrom through the network; and wherein at least one of the plurality of motorized window covering assemblies is further communicably coupled, through RF, to an RF device and configured to receive a second control command therefrom through RF.

2. The network of motorized window covering assemblies of claim 1, wherein the WiFi interface and the RF interface are an integrated WiFi/RF module.

3. The network of motorized WiFi window covering assemblies of claim 1, wherein the remote device is one of smart phone and tablet.

* * * * *